US009138095B2

(12) United States Patent
Peretti et al.

(10) Patent No.: US 9,138,095 B2
(45) Date of Patent: Sep. 22, 2015

(54) BEVERAGE DISPENSER WITH SAFE CLEANING ARRANGEMENT

(75) Inventors: Lionel Peretti, Bron (FR); David Larzul, Meyzieu (FR); Blaise Rithener, La Tour-de-Peilz (CH)

(73) Assignee: Nestec S.A., Vevey (CH)

( * ) Notice: Subject to any disclaimer, the term of this patent is extended or adjusted under 35 U.S.C. 154(b) by 27 days.

(21) Appl. No.: 13/576,845

(22) PCT Filed: Feb. 2, 2011

(86) PCT No.: PCT/EP2011/051455
§ 371 (c)(1),
(2), (4) Date: Aug. 2, 2012

(87) PCT Pub. No.: WO2011/095511
PCT Pub. Date: Aug. 11, 2011

(65) Prior Publication Data
US 2012/0305111 A1 Dec. 6, 2012

(30) Foreign Application Priority Data

Feb. 3, 2010 (EP) .................................... 10152558

(51) Int. Cl.
F03B 11/00 (2006.01)
A47J 31/44 (2006.01)
A47J 31/46 (2006.01)
A47J 31/60 (2006.01)

(52) U.S. Cl.
CPC .............. *A47J 31/4485* (2013.01); *A47J 31/46* (2013.01); *A47J 31/60* (2013.01); *Y10T 137/8376* (2015.04)

(58) Field of Classification Search
USPC ........... 222/146.2, 146.4, 108, 148, 533–537; 137/560; 134/22.1–24
See application file for complete search history.

(56) References Cited

U.S. PATENT DOCUMENTS 4,450,987 A * 5/1984 Boettcher et al. ............. 222/641
6,769,627 B2 * 8/2004 Carhuff et al. ................ 239/120
7,707,927 B2 * 5/2010 Boussemart et al. ........... 99/280
(Continued)

FOREIGN PATENT DOCUMENTS

EP 0 791 321 8/1997
EP 1125536 A2 * 8/2001
(Continued)

OTHER PUBLICATIONS

Written Opinion of the International Searching Authority for PCTEP2011051455 mailing date Apr. 21, 2011, 5 pages.
(Continued)

*Primary Examiner* — Donnell Long
(74) *Attorney, Agent, or Firm* — K&L Gates LLP

(57) ABSTRACT

A beverage preparation machine (1) has: a housing (5); a duct (10) with an outlet (15); a conduit (20) upstream the duct and connected thereto; and a waste liquid collector (30) arranged to collect waste liquid from the outlet. The duct has: an operative position for circulating beverage through the conduit and dispensing said beverage from the outlet outside the housing above a user-receptacle filling area (35); and a cleaning position for circulating cleaning fluid through the conduit and evacuating said cleaning fluid from the outlet inside the housing to the waste liquid collector. The duct is pivotally assembled about a pivoting axis (11) to the conduit for pivoting the outlet between the operative position and the cleaning position.

14 Claims, 2 Drawing Sheets

(56) References Cited

U.S. PATENT DOCUMENTS

| | | |
|---|---|---|
| 7,913,614 B2 | 3/2011 | Fukushima et al. |
| 8,485,090 B2 | 7/2013 | Morin et al. |
| 2011/0023723 A1* | 2/2011 | Morin et al. ............ 99/323.3 |

FOREIGN PATENT DOCUMENTS

| | | |
|---|---|---|
| EP | 0997093 | 7/2003 |
| EP | 1 656 863 | 5/2006 |
| EP | 1 716 796 | 11/2006 |
| FR | 2929090 | 10/2009 |
| JP | 2000300223 | 10/2000 |
| WO | WO 2009122039 A1 * | 10/2009 |

OTHER PUBLICATIONS

International Search Report for PCTEP2011051455 mailing date Apr. 21, 2011, 3 pages.
Russian Office Action 2012137292/12 dated May 22, 2014, 5 pages.
Office Action issued in JP Application 2012-551608 mailed Dec. 16, 2014, 7 pages.

* cited by examiner

BEVERAGE DISPENSER WITH SAFE CLEANING ARRANGEMENT

CROSS REFERENCE TO RELATED APPLICATIONS

The present application is a National Stage of International Application No. PCT/EP2011/051455, filed on Feb. 2, 2011, which claims priority to European Patent Application No. 10152558.2, filed on Feb. 3, 2010, the entire contents of which are being incorporated herein by reference.

FIELD OF THE INVENTION

The present invention relates to a machine for dispensing a beverage to a user-receptacle, such as a user-cup or a user-mug, via a beverage outlet, having a hygiene safeguarding arrangement for carrying out a self-cleaning process. The beverage may in particular be milk-containing, e.g. within the context of coffee and/or chocolate drink preparation.

For instance, the beverage preparation machine combines a coffee brewing unit and a milk heating and/or frothing unit for the preparation café latte, cappuccinos and/or regular coffee with milk.

BACKGROUND ART

Machines for producing beverages, in particular beverages likely to degrade over time, such as milk-containing beverages, e.g. milk-containing coffee, tea or chocolate drinks are well known in the art.

As known in the art, in order to produce such a beverage, water may be passed via a heater for producing steam. The thus generated water steam can be fed to a mixing head in which, e.g. by applying a Venturi effect, milk supplied from a milk supply and air from an air inlet is sucked into the water steam flow which results in a heated water/milk mixture which can then be drained from an outlet nozzle of the mixing head into a cup.

A well known problem is that after having produced the desired amount of beverage, the parts of the machine that have been exposed to the beverage bear residues thereof, in particular milk, that may degrade or be unwantedly mixed with subsequently prepared beverages, in particular milk-free beverages, when the machine is suitable to prepare different types of beverages.

A typical example of such undesirable residue issues is encountered with in-line milk vapour-operated frothing or heating heads. The inlet of the head, the interior of the head itself as well as the outlet nozzle are exposed to milk and thus have to be cleaned to prevent contamination, e.g. by rinsing. In known devices, this is a labour intensive and time consuming work asking for a manual rinsing of the described milk flow path. The rinsing and/or cleaning can actually take substantially more time and effort than the step of producing the mixture. The cleaning is particularly difficult when the milk has dried on the surfaces of the mixing head. On the other hand, if the cleaning is not carried out properly and frequently enough, there can be hygiene-related problems in any subsequent use of the device.

A solution to this problem has been proposed in EP 1 656 863. A movable in-line venturi-based milk frothing head has a self-cleaning configuration in which the milk suction inlet is moved and dipped into a rinsing media and the milk outlet is moved over a collector for the used rinsing media. In this configuration, the rinsing media is driven through the head for cleaning thereof. The milk frothing head can be motorized to carry out the entire cleaning process automatically.

EP 1 374 748 discloses a venturi-type in-line frother which has: a milk inlet connected to a milk container; a water (steam) inlet connected to a water source; and an air inlet. The frother has a three-way valve to divert water or steam from the water source into the air inlet line and therefrom into the emulsification chamber for rinsing thereof. Simultaneously, steam is passed via the steam supply line into the steam inlet. The flushing water passed through the frother is collected in a waste basin. Consequently, milk traces are flushed out of the air and steam lines. The flushing process may be carried out at the end of each beverage preparation or at the user's request or automatically after some delay after a beverage preparation to avoid accidental scalding if a user inserts his or her hand beneath the beverage discharge duct immediately after beverage preparation.

Another approach involves the use of disposable parts that are exposed to the degradable liquid such as milk, for example as taught in EP 1 746 920.

There is still a need to provide a simple and hygienic cleaning arrangement for a beverage preparation machine.

SUMMARY OF THE INVENTION

A preferred object of the invention relates to a beverage preparation machine that has a simple and safe hygienic configuration for self-cleaning.

Therefore, the invention relates to a beverage preparation machine that comprises: a housing; a duct that has an outlet; a conduit upstream the duct and connected thereto; and a waste liquid collector arranged to collect waste liquid from the outlet. This duct has:
  an operative position for circulating beverage through the conduit and along the duct and dispensing such a beverage from the duct outlet outside the housing above a user-receptacle filling area; and
  a cleaning position for circulating cleaning fluid through the conduit and along the duct and evacuating such cleaning fluid from the duct outlet inside the housing to the waste liquid collector.

In accordance with the invention the duct is pivotally assembled to the conduit for pivoting the outlet between the operative position and the cleaning position, in particular from the operative position to the cleaning position, and optionally vice versa.

In a variation, the invention also relates to beverage preparation machine that comprises: a housing; a duct that extends outside the housing and that has an outlet; and a waste liquid collector for collecting waste liquid from the outlet. This duct has:
  an operative position for circulating a beverage through the duct extending outside the housing and dispensing such a beverage from the outlet outside the housing above a user-receptacle filling area; and
  a cleaning position for circulating a cleaning fluid through the duct extending outside the housing and evacuating such a cleaning fluid from the outlet to the waste liquid collector.

The duct may be pivotally mounted for passing between the operative and the cleaning positions, in particular from the operative to the cleaning positions, and optionally vice versa.

In accordance with the invention, the outlet in the cleaning position is located in the housing for evacuating within the housing such a cleaning fluid from the beverage outlet into the waste liquid collector.

Hence, a simple configuration is provided for safely cleaning, in particular rinsing, the beverage fluid circulation arrangement, in particular the downstream part thereof up to and including the beverage dispensing outlet. Indeed, only the extremity of the downstream part of the circulation arrangement needs to be movable to carry out the evacuation of the cleaning fluid in a shielded, in particular confined area, to prevent exposure of a user.

The housing within which the outlet evacuates the cleaning fluid, may contain the main parts of the beverage preparation machine, including such parts like a pump, heater, cooler, control unit, mixing unit, brewing unit, etc. . . . or may be a dedicated housing for forming a separate confinement or shielding area for the evacuation of cleaning fluid via the duct's outlet.

Further features and advantages of the invention will appear in the detailed description.

BRIEF DESCRIPTION OF THE DRAWINGS

The invention will now be described with reference to the schematic drawings, wherein.

DETAILED DESCRIPTION

Figure 1:
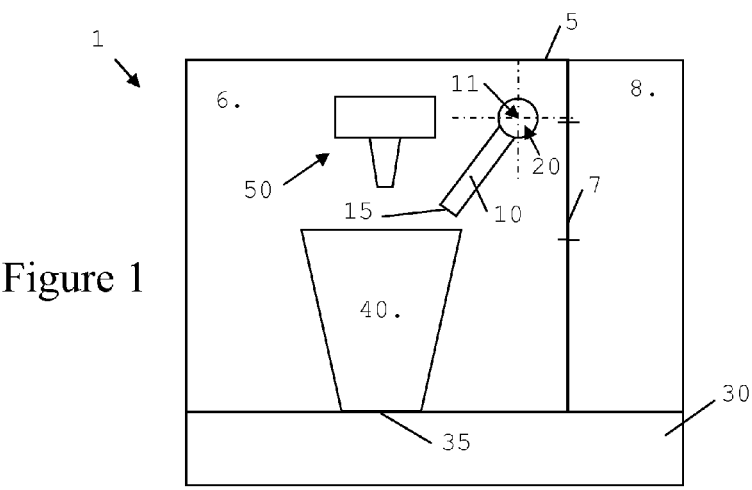
FIGS. 1 to 3 schematically illustrate a first embodiment of a beverage preparation machine according to the invention.
Figure 2:
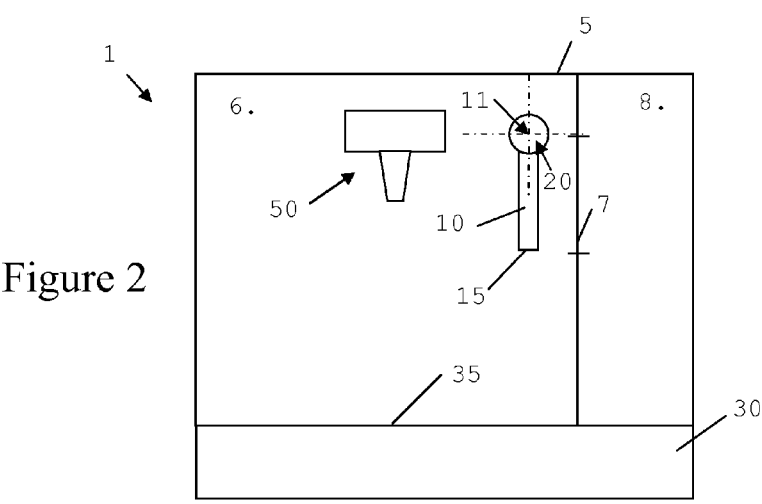
Figure 3:
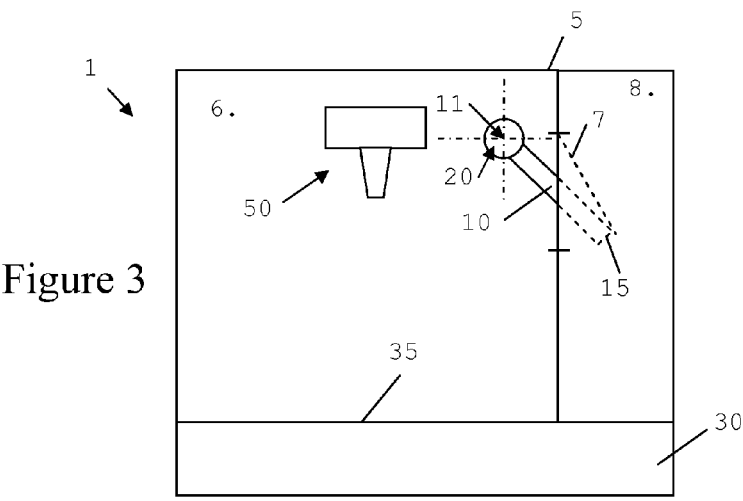

FIGS. 1 to 3 show schematic front views of a beverage preparation machine 1 according to a first embodiment of the invention. Machine 1 has a housing 5, a duct 10 that has an outlet 15, a conduit 20 upstream duct 10 and connected thereto and a waste liquid collector in the form of a collection tray 30 arranged to collect waste liquid from outlet 15.

In FIG. 1, duct 10 is shown in an operative position for circulating a beverage through conduit 20, into duct and for dispensing such beverage from outlet 15 outside housing 5 above a user-receptacle 40, e.g. a mug or cup, resting on a receptacle filling area 35 formed by a grid on collector 30. Housing 5 has a front wall 6 delimiting on one side filling area 35 that extends horizontally in front of machine 1.

In FIG. 2, duct 10 is shown in an intermediate position between the operative position shown in FIG. 1 and a cleaning position shown in FIG. 3.

Right before cleaning, outlet 15 is pivoted, typically automatically, into housing 5. In the cleaning position (FIG. 3), duct 10 is arranged to circulate cleaning fluid fed via conduit 20 and evacuate such a cleaning fluid from outlet 15 inside housing 5 to collection tray 30.

Collection tray 30 extends from inside to outside housing 5 so that outlet 15 is situated above tray 30 in the operative position (FIG. 1) as well as in the intermediate position (FIG. 2) as well as in the cleaning position (FIG. 3).

Hence, collector 30 is arranged to collect from outlet 15 waste beverage in the operative and intermediate positions as well as used cleaning fluid in the cleaning and intermediate positions.

Furthermore, housing 5 has an opening, for instance covered with a pivotable gate 7, e.g. a hatch, for allowing the passage of outlet 15 when pivoted into housing 5, as illustrated in FIG. 3. gate 7 may be pivotally mounted so that it can be pushed open by duct pivoting into the cleaning position (FIG. 3). Furthermore, gate 7 may return into its closed configuration (FIGS. 1 and 2) under the effect of gravity when duct 10 is pivoted out from housing 5. Other gate configurations are of course possible, in particular motorised gates that are opened and closed in alignment with the movements of duct 10.

It is also possible to use a return-spring, e.g. helicoidal, traction or compression spring, that is stressed against the actuator when moving the duct into one position, e.g. into the cleaning position, and that returns automatically the duct into another position, e.g. the intermediate or operative position, by slackening typically when the actuator is deactivated.

As illustrated in FIGS. 1 to 3, duct 10 is pivotally assembled to conduit 20 for moving outlet 15 from the operative position (FIG. 1) to the cleaning position (FIG. 3) via the intermediate position (FIG. 2). The intermediate position may be a position of inactivity (standby) of duct 10.

In a variation, it is possible to combine the active position and the inactive position. For instance, the duct is in its vertical position to rest or dispense beverage and pivoted into its cleaning position with its outlet moved into the housing for evacuating the cleaning fluid, e.g. by means of an actuator such as an electric actuator. From the cleaning position, the duct can pivot back into the active/inactive position under the effect of gravity upon deactivation of the actuator or by means of an actuator such as an electric actuator.

Duct 10 can be moved by an electric actuator, in particular an electro-mechanic actuator such as an electromagnet or a motor, from the operative position to the cleaning position and/or vice versa. For instance, duct 10 is moved into the operative and the cleaning positions (FIGS. 1 and 3) by activation of an electric actuator and brought back into the intermediate position (FIG. 2) under the effect of gravity when the actuator is deactivated. In a different configuration, it is of course also possible to have the duct brought by gravity into the operative position or into the cleaning position.

Conduit 20 extends from inside housing 5 through front wall 6 of housing 5, generally perpendicularly thereto, out of housing 5. Outside of housing 5, duct 10 is mounted perpendicularly to conduit 20 and is pivotable in a plane generally parallel to front wall 6. Hence, pivoting axis 11 of duct 10 is generally perpendicular to front wall 6. Consequently, outlet 15 is pivoted into a side part 8 of housing 5 bearing gate 7. Side part 8 delimits on the side beverage filling area 35.

Typically, conduit 20 is connected to a unit for preparing a beverage such as tea, coffee, chocolate, soup or milk, in particular cold or hot beverage.

In the embodiment shown in FIGS. 1 to 3, conduit 20 can be connected inside the machine to a milk heating and/or frothing arrangement (not shown). For example, this arrangement includes a mixing head for mixing milk with air and/or steam. Alternatively, the mixing head may be associated with duct 10. Venturi-based mixing heads, as generally known in the art, are for example disclosed in EP 1 656 863 and in EP 1 746 920.

Typically, the cleaning fluid circulated through conduit 20 and duct 10, e.g. via a venturi-based mixing head, is water or water-containing, optionally with a descaling agent or detergent. The cleaning fluid may be air or air-containing. For instance, Machine 1 is arranged to run a cleaning process whereby air and steam and/or water are sequentially supplied through the conduit 20 and evacuated via outlet 15 of duct 10.

In the operative position, duct 10 extends outside of housing 5 and is arranged to dispense the beverage from outlet 15. In the cleaning position, duct 10 is arranged to circulate the cleaning fluid through duct 10 still extending outside of housing 5 and evacuate the cleaning fluid via outlet 15 located within housing 5 into waste liquid collector 30. In other words, in the cleaning position, duct 10 extends from outside into housing 5 for evacuating the cleaning liquid in a shielded, confined space separated from the user. Thus the user is safely protected by housing 5 from the evacuated cleaning fluid.

A coffee or tea dispensing head 50 is also shown in FIGS. 1 to 3. Typically, machine 1 is a coffee or tea machine integrating a milk dispensing arrangement.

For instance, machine 1 combines a coffee brewing unit for dispensing coffee via head 50 and a milk heating and/or frothing unit dispensing heated and/or frothed milk via outlet 15, for the preparation café latte, cappuccinos and/or regular coffee with milk within the same machine and optionally automatically, i.e. the combination of milk and coffee being carried automatically by the machine upon a request of a user for such a milk-containing coffee.

For instance, machine 1 is a coffee or tea preparation machine, such as a self-contained table-top machine that can be electrically connected to the mains, e.g. at home or in an office. In particular, machine 1 is arranged for preparing within an ingredient processing arrangement a beverage by passing hot or cold water or another liquid through a capsule containing an ingredient of the beverage to be prepared, such as ground coffee or tea. A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

For example, machine 1 comprises: an ingredient processing arrangement including one or more of a liquid reservoir, liquid circulation circuit, a heater, a pump and a beverage preparation unit arranged to receive ingredient capsules for extraction and evacuate capsules upon extraction; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550, WO 2009/130099 and PCT/EP09/053139.

The beverage processing arrangement may include one or more of the following components:
 a) a brewing unit for receiving an ingredient of this beverage, in particular a pre-portioned ingredient supplied within a capsule, and for guiding an incoming flow of liquid, such as water, through said ingredient to a beverage outlet;
 b) an in-line heater, such as a thermoblock, for heating this flow of liquid to be supplied to the brewing unit;
 c) a pump for pumping this liquid through the in-line heater;
 d) one or more fluid connecting members for guiding this liquid from a source of liquid, such as a tank of liquid, to the beverage outlet;
 e) an electric control unit, in particular comprising a printed circuit board (PCB), for receiving instructions from a user via an interface and for controlling the in-line heater and the pump; and
 f) one or more electric sensors for sensing at least one operational characteristic selected from characteristics of the brewing unit, the in-line heater, the pump, a liquid reservoir, an ingredient collector, a flow of this liquid, a pressure of this liquid and a temperature of this liquid, and for communicating such characteristic(s) to the control unit.

The heater may be a thermoblock or an on demand heater (ODH), for instance an ODH type disclosed in EP 1 253 844, EP 1 380 243 and EP 1 809 151.

Figure 4:
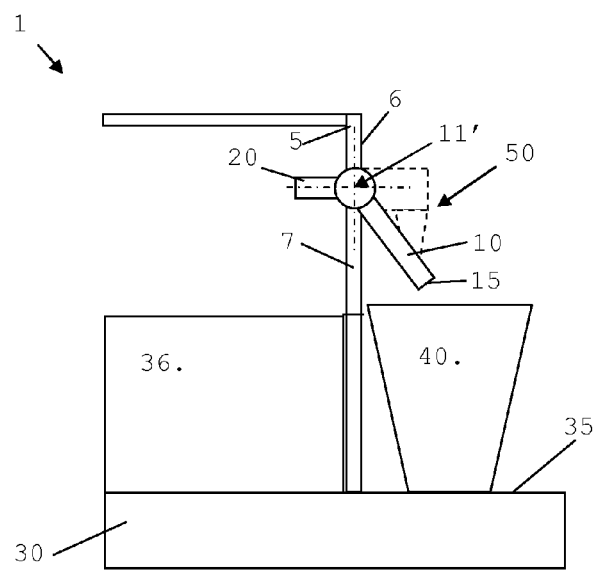
FIGS. 4 and 5 schematically illustrate a second embodiment of a beverage preparation machine according to the invention.
Figure 5:
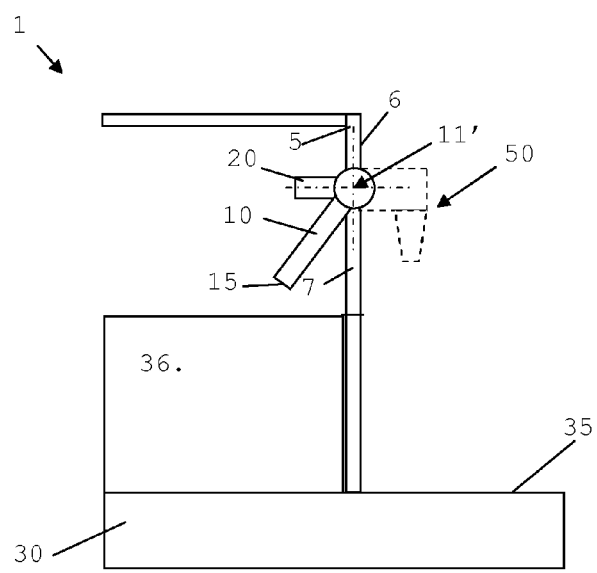

FIGS. 4 and 5, in which the same numeric references designate generally the same or similar components, show a schematic cross-sectional side view of a variation of a beverage preparation machine 1, in accordance with the invention.

Machine 1 has a housing 5 with a front wall 6, a duct 10 that has an outlet 15, a conduit 20 upstream duct 10 and connected thereto, and a waste liquid collector 30 arranged to collect waste liquid from outlet 15. Duct 10 has: an operative position (FIG. 4) for circulating beverage through conduit 20 and dispensing this beverage from outlet 15 outside housing 5 above a user-receptacle filling area 35 into a cup or mug 40; and a cleaning position (FIG. 5) for circulating cleaning fluid through conduit 20 and evacuating this cleaning fluid from outlet 15 inside housing 5 to collector 30.

Duct 10 is pivotally assembled to conduit 20 at a pivoting point 11 for pivoting outlet 15 between the operative position (FIG. 4) and the cleaning position (FIG. 5).

The fluid line formed by conduit 20 and duct 10 extends through front wall 6 of housing 5. Duct 10 is pivotally mounted to conduit 20 at front wall 6 of housing 5 along pivoting axis 11 that extends generally parallelly to wall 6, in contrast to the embodiment shown in the previous Figures. In the embodiment shown in FIGS. 4 and 5, pivoting axis 11 extends within front wall 6.

Moreover, duct 10 is able to pivot in an out of housing 5 via an opening 7 allowing the passage of duct 10. Duct 10 may have an intermediate rest position inbetween the operative and cleaning positions, e.g. at the level of housing 5, in particular of housing wall 6. Duct 10 may be automatically moved from the operative to the cleaning position and vice versa via an actuator, e.g. an electro-magnet.

Front wall 6 delimits user-receptacle filling area 35. Waste liquid collector 30 is provided in the form of a tray that extends from inside housing 5 to outside the housing underneath outlet 15 in its operative position. In particular, collector 30 is arranged to collect waste beverage draining from outlet 15 in the operative position in addition to collecting cleaning liquid evacuated from outlet 15 in its cleaning position. Collector tray 30 supports a receptacle 36 for collecting used beverage ingredient, in particular ground coffee upon brewing, for example contained in pre-portioned capsules. Examples of used-ingredient receptacles 36, liquid collecting trays 30 and user-receptacle supports are disclosed in EP 1 731 065, EP 1 867 260, WO 2009/074559 and WO 2009/135869, the contents of which are hereby incorporated by way of reference.

Typically, conduit 20 is connected to a unit (not shown) for preparing a beverage, such as tea, coffee, chocolate, soup or milk, in particular cold or hot beverage. In particular, the beverage preparation unit includes a milk heating and/or frothing arrangement. For example, the beverage preparation unit comprises a mixing head for mixing milk with air and/or steam, in particular a venturi-based mixing head, that is connected to a milk supply, a steam supply and an air supply.

The cleaning fluid is circulated through conduit 20, duct 10 and evacuated via outlet 15 into receptacle 36 from where the fluid drains into collector 30. This fluid can be water or water-containing, optionally with a descaling agent or a detergent, and/or air or air-containing. In particular, machine 1 has a control unit (not shown) connected to the fluid circuit that includes duct 10 and conduit 20, in particular the fluid circuit comprises a pump connected to a source of cleaning fluid, and arranged to run a cleaning process whereby air and steam and/or water are sequentially supplied through the conduit and evacuated via the outlet of the duct.

By evacuating the cleaning fluid via outlet 15 within housing 5, i.e. in a shielded or confined space, the user is protected against projections of cleaning fluid during a cleaning cycle, in particular protected steam and hot water that could spurt from outlet 15 and burn the user.

Moreover, if the cleaning process is programmed to be carried out automatically at specific periods of time, the outlet 15 is moved into housing 5 before evacuation of the cleaning fluid. Hence, there is no risk of evacuation of cleaning fluid to a user-receptacle 40 that would have been put onto receptacle filling area 35 just when machine 1 is about to start the automatic cleaning process. It follows that under these circumstances, the risk of inadvertently filling a user receptacle 40 with evacuated cleaning liquid instead of beverage is excluded.

The invention claimed is:

1. A beverage preparation machine comprising:
   a housing;
   a duct having an outlet;
   a conduit upstream from the duct and connected thereto; and
   a waste liquid collector arranged to collect waste liquid from the outlet,
   the duct comprising: an operative position for circulating beverage through the conduit and along the duct and dispensing the beverage from the outlet outside the housing above a user-receptacle filling area; and a cleaning position for circulating cleaning fluid through the conduit and along the duct and evacuating the cleaning fluid from the outlet inside the housing to the waste liquid collector; and
   the duct is configured to pivot the outlet from an operative position into a cleaning position and is pivotally mounted to the conduit outside the housing.

2. The machine of claim 1, wherein the duct is moved by a spring and/or an electric actuator from the operative position to the cleaning position and/or vice versa.

3. The machine of claim 1, wherein the waste liquid collector collects waste beverage draining from the outlet in the operative position and/or has an arrangement for collecting liquid from the user-receptacle filling area.

4. The machine of claim 1, wherein the conduit is connected to a unit for preparing a beverage.

5. The machine of claim 4, wherein the beverage preparation unit comprises a milk heating and/or frothing arrangement.

6. The machine of claim 5, wherein the beverage preparation unit comprises a mixing head for mixing milk with air and/or steam.

7. The machine of claim 1, which is arranged to circulate water or water-containing fluid as the cleaning fluid.

8. The machine of claim 1, which is arranged to circulate air or air-containing fluid as the cleaning fluid.

9. The machine of claim 1, which is arranged to run a cleaning process whereby air and steam and/or water are sequentially supplied through the conduit and evacuated via the outlet of the duct.

10. A beverage preparation machine comprising:
    a housing;
    a duct having an outlet;
    a conduit upstream from the duct and connected thereto; and
    a waste liquid collector arranged to collect waste liquid from the outlet,
    the duct comprising: an operative position for circulating beverage through the conduit and along the duct and dispensing the beverage from the outlet outside the housing above a user-receptacle filling area; and a cleaning position for circulating cleaning fluid through the conduit and along the duct and evacuating the cleaning fluid from the outlet inside the housing to the waste liquid collector; and
    the duct is pivotally assembled to the conduit for pivoting the outlet from an operative position to a cleaning position, and the duct extends outside the housing in both its operative position and cleaning positions, the outlet in the cleaning position being located in the housing for evacuating the cleaning fluid within the housing from the outlet into the waste liquid collector.

11. A beverage preparation machine comprising:
    a housing;
    a duct having an outlet;
    a conduit upstream from the duct and connected thereto; and
    a waste liquid collector arranged to collect waste liquid from the outlet,
    the duct comprising: an operative position for circulating beverage through the conduit and along the duct and dispensing the beverage from the outlet outside the housing above a user-receptacle filling area; and a cleaning position for circulating cleaning fluid through the conduit and along the duct and evacuating the cleaning fluid from the outlet inside the housing to the waste liquid collector; and
    the duct is pivotally assembled to the conduit for pivoting the outlet between an operative position and a cleaning position,
    wherein the housing has a wall through which the duct and/or the conduit extend, the duct being pivotally assembled to the conduit along a pivoting axis extending generally parallel to the wall.

12. The machine of claim 11, wherein the housing wall defines user-receptacle filling area.

13. A beverage preparation machine comprising: a housing; a duct having an outlet; a conduit upstream from the duct and connected thereto; and a waste liquid collector arranged to collect waste liquid from the outlet,
    the duct comprising: an operative position for circulating beverage through the conduit and along the duct and dispensing the beverage from the outlet outside the housing above a user-receptacle filling area; and a cleaning position for circulating cleaning fluid through the conduit and along the duct and evacuating the cleaning fluid from the outlet inside the housing to the waste liquid collector; and
    the duct is pivotally assembled to the conduit for pivoting the outlet between an operative position and a cleaning position,
    wherein the housing has a wall through which the duct and/or the conduit extend, the duct being pivotally assembled to the conduit along a pivoting axis extending generally perpendicularly to the wall.

14. The machine of claim 13, wherein the housing wall defines user-receptacle filling area.

* * * * *